(No Model.)
W. H. HORNER.
SPRING FASTENING KEY.
No. 342,014. Patented May 18, 1886.
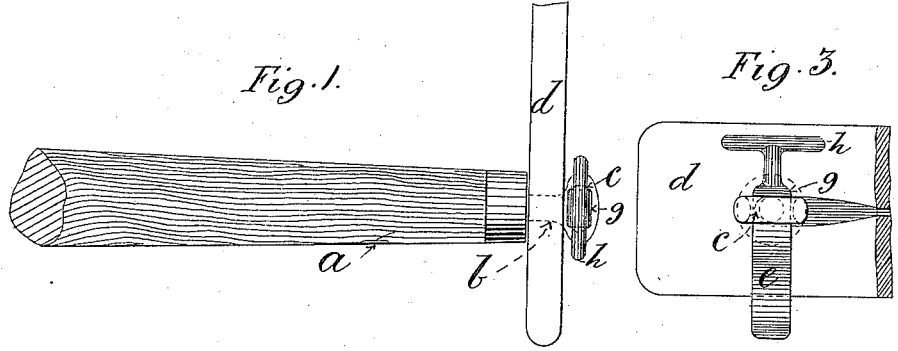
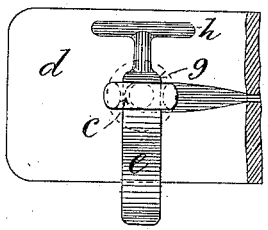
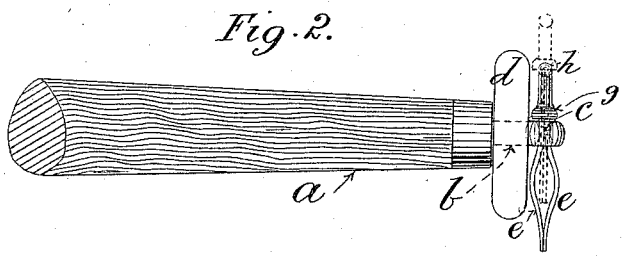
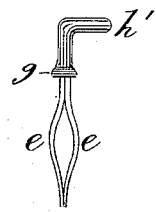
WITNESSES
Edward W. Furele
Jos. W. Crookes.
INVENTOR
William H. Horner
Paul Bakewell
att'y.

UNITED STATES PATENT OFFICE.

WILLIAM H. HORNER, OF ST. LOUIS, MISSOURI.

SPRING FASTENING-KEY.

SPECIFICATION forming part of Letters Patent No. 342,014, dated May 18, 1886.

Application filed March 26, 1886. Serial No. 196,622. (No model.)

*To all whom it may concern:*

Be it known that I, WILLIAM H. HORNER, a citizen of the United States, residing in the city of St. Louis, State of Missouri, have invented a certain new and useful Improvement in Flexible Self-Adjusting Keys, of which the following is a full, clear, and exact description.

My invention has for its object to provide a simple and ready means of forming a lock through a hasp, and of securing bolts, staples, and the like, and also of securing the traces of horses onto the ends of single and double trees of carriages, wagons, and the like.

The application of my device is illustrated by the accompanying drawings, where it is shown and illustrated as fastening a trace.

According to a system in present use, each end of a single-tree is provided with a stem or shank terminating in an eyelet, the trace being passed onto the stem or shank, and secured thereon by a strip or tag of leather, which is fixed at one end to the tree, and thence passed over the edge of the trace and through the eyelet of the stem or shank. By this arrangement the leather tag is liable to slip out of the eyelet, and so cause the trace to become unhitched from the tree. The application of my invention to this purpose consists in substituting for the leather tag above named a double spring-holder having a shoulder and handle, and so operating that when passed through the eyelet of the stem or shank the holder is prevented from slipping out of the latter, and thereby effectually secures the trace on the tree.

On the accompanying drawings, Figure 1 is a plan, broken away, of the end of a single-tree provided with my improved key or fastener; Figs. 2 and 3, side and end views, respectively, thereof; and Fig. 4, a modification of my device, like letters of reference denoting like parts in all the figures.

$a$ represents the end of a single-tree having stem or shank $b$, with its eyelet $c$, as at present, the trace $d$ being hitched onto the tree $a$, and held thereon by a double spring-holder, which is composed of two thin rectangular, semi-oval, or other shaped spring-steel or other metal strips (or pins) $e\,e$, which, when pressed together on their flats correspond, or nearly so, in cross-section with the shape of the eyelet $c$ of the stem or shank $b$. The strips (or pins) $e\,e$ are in contact flatwise at their respective ends, between which they normally tend to spring outward from each other in a concaved form, as shown in Fig. 2. The strips (or pins) $e\,e$ project at one end from the shoulder $g$, which is provided with a cross-handle, $h$ or $h'$, as seen in Fig. 4.

On pressing the strips $e\,e$ together flatwise the spring holder or fastener is passed through the eyelet $c$ until its shoulder $g$ is against the circumference of the eyelet $c$, when, the pressure being removed from the strips $e\,e$, they fly outward into the position shown, and so prevent the holder from slipping out of the eyelet $c$, whereby the trace $d$ is effectually held on the tree $a$ and cannot become accidentally unhitched.

When it is desired to remove the trace $d$ from the tree $a$, the holder is pulled by the handle $h$ or $h'$, as the case may be, and in so doing its strips $e\,e$ are constrained together flatwise by the sides of the eyelet $c$, as shown by dotted lines in Fig. 2, which enables the holder to be withdrawn from the eyelet $c$.

This description of fastening may be used for securing staples, bolts, washers, and the like.

I claim as my invention—

In a fastening-pin, the combination of the spring strips (or pins) $e\,e$ with shoulder $g$ and handle $h$, (or $h'$,) substantially as shown and described.

In testimony whereof I have affixed my signature, in presence of two witnesses, this 24th day of March, 1886.

WILLIAM H. HORNER.

Witnesses:
JOS. W. CROOKES,
AUGUSTE L. PRIEST.